(12) United States Patent
Berisha et al.

(10) Patent No.: US 9,394,861 B2
(45) Date of Patent: Jul. 19, 2016

(54) FILTER ELEMENT AND FILTER DEVICE

(75) Inventors: Bashkim Berisha, Leonberg (DE); Max Eilers, Stuttgart (DE); Andreas Schieszl, Ellwangen (DE); Hendrik Von Merkatz, Remseck (DE)

(73) Assignee: Mahle International GmbH (DE)

( * ) Notice: Subject to any disclaimer, the term of this patent is extended or adjusted under 35 U.S.C. 154(b) by 190 days.

(21) Appl. No.: 14/126,850

(22) PCT Filed: Jun. 14, 2012

(86) PCT No.: PCT/EP2012/061357
§ 371 (c)(1),
(2), (4) Date: Mar. 26, 2014

(87) PCT Pub. No.: WO2012/172020
PCT Pub. Date: Dec. 20, 2012

(65) Prior Publication Data
US 2014/0215980 A1 Aug. 7, 2014

(30) Foreign Application Priority Data
Jun. 17, 2011 (DE) .......... 10 2011 077 715

(51) Int. Cl.
*B01D 46/00* (2006.01)
*F02M 35/024* (2006.01)
*B01D 46/52* (2006.01)
*F02M 35/10* (2006.01)
*B01D 46/24* (2006.01)

(52) U.S. Cl.
CPC ..... *F02M 35/02425* (2013.01); *B01D 46/2418* (2013.01); *B01D 46/521* (2013.01); *F02M 35/0245* (2013.01); *F02M 35/02483* (2013.01); *F02M 35/10373* (2013.01)

(58) Field of Classification Search
CPC .............................. B01D 46/10; B01D 46/125
USPC ................. 55/385.1, 495, 500, 502, 511, 521
See application file for complete search history.

(56) References Cited

U.S. PATENT DOCUMENTS 3,016,984 A 1/1962 Getzin
4,014,796 A 3/1977 Sugiyama et al.
(Continued)

FOREIGN PATENT DOCUMENTS

DE 19746751 * 4/1997 ............. B01D 29/21
DE 19746751 A1 4/1999
(Continued)

OTHER PUBLICATIONS

English abstract for JP2005-246253, Sep. 2005.
(Continued)

*Primary Examiner* — Jason M Greene
*Assistant Examiner* — Karla Hawkins
(74) *Attorney, Agent, or Firm* — Fishman Stewart PLLC

(57) ABSTRACT

A filter element for a filtering device used for filtering a fluid may include an annular filter body including a web-like, folded filter material, the filter body enclosing an inner space in the circumferential direction. The filter element may include an inner frame arranged on an inner side of the filter body facing the inner space. The inner frame may have a least one radially outwardly projecting and axially extending alignment strip arranged between two adjacent folds in the filter material in the circumferential direction. The at least one alignment strap may bear against the two adjacent folds. The inner frame may include a flow sleeve or may be configured as a flow sleeve.

20 Claims, 8 Drawing Sheets

(56) References Cited

U.S. PATENT DOCUMENTS

| | | | |
|---|---|---|---|
| 6,368,506 | B1 | 4/2002 | Gebert et al. |
| 7,462,282 | B2 | 12/2008 | Mees et al. |
| 2012/0314530 | A1* | 12/2012 | Trottier et al. ............. 366/167.1 |
| 2013/0199143 | A1* | 8/2013 | Zou et al. .......................... 55/502 |

FOREIGN PATENT DOCUMENTS

| | | |
|---|---|---|
| DE | 19810633 A1 | 9/1999 |
| DE | 10235275 A1 | 2/2004 |
| DE | 202006004927 U1 | 8/2007 |
| DE | 202008010504 U1 | 12/2009 |
| EP | 1743687 A1 | 1/2007 |
| JP | 2005-246253 A | 9/2005 |
| WO | WO-2011/048197 A1 | 4/2011 |

OTHER PUBLICATIONS

English abstract for DE-19810633, Sep. 1999.
International Search Report for PCT/EP2012/061357 Dated Jan. 3, 2013.

* cited by examiner

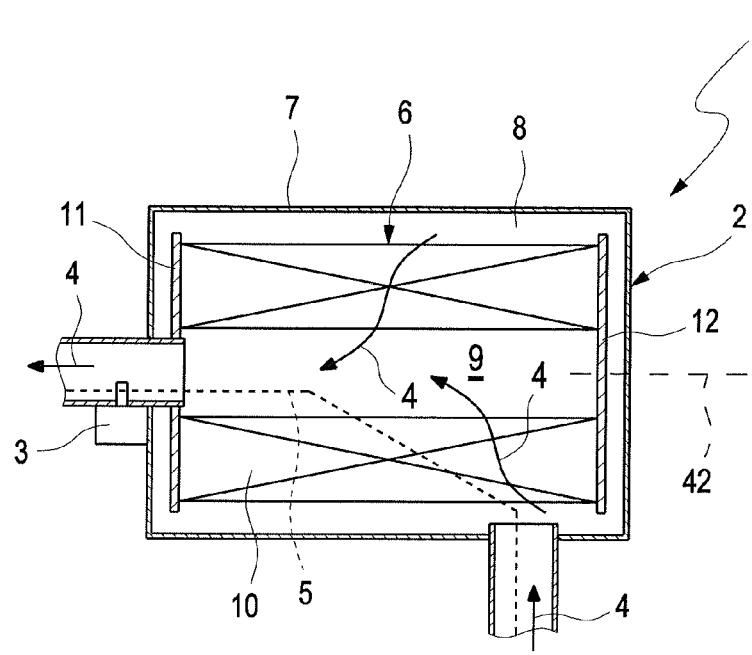
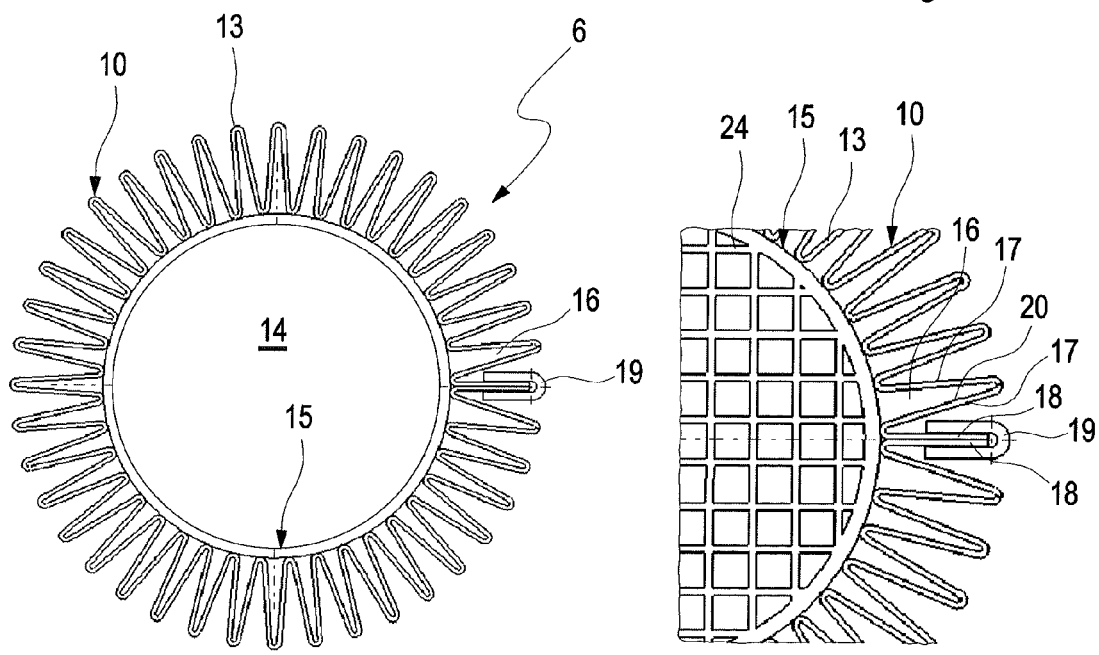
Fig. 1
Fig. 2     Fig. 3

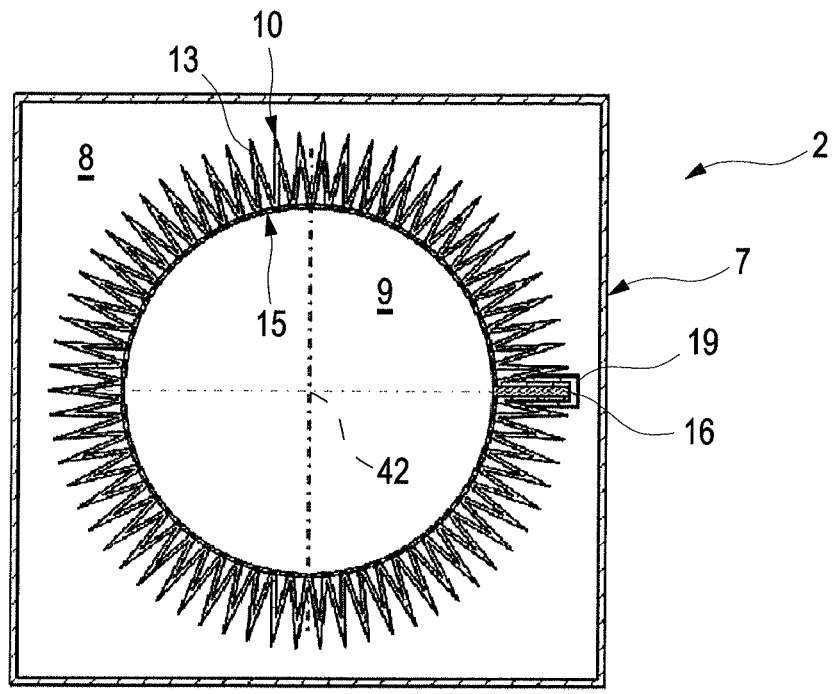
Fig. 11
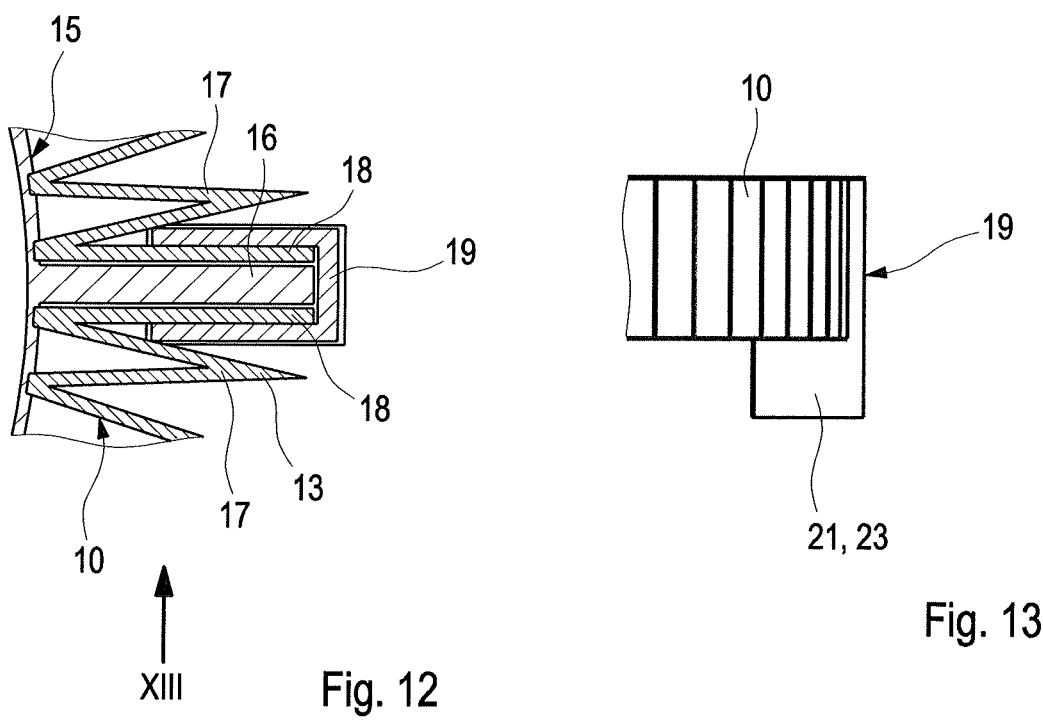
Fig. 12
Fig. 13

FILTER ELEMENT AND FILTER DEVICE

CROSS-REFERENCE TO RELATED APPLICATIONS

This application claims priority to German Patent Application 10 2011 077 715.6 filed Jun. 17, 2011 and International Patent Application PCT/EP2012/061357 filed on Jun. 14, 2012, both of which are hereby incorporated by reference in their entirety.

TECHNICAL FIELD

The present invention relates to a filter element for a filter device for filtering a fluid. The invention also relates to a filter device equipped with such a filter element.

BACKGROUND

Filter elements and filter devices can be used for example in motor vehicles to filter fluids. For example, a fresh air system can have an air filter device to filter fresh air which is to be supplied to a combustion process in the combustion chambers of an internal combustion engine of the vehicle. It is of critical importance for optimal operation of the internal combustion engine to know the quantity or mass of air supplied to the combustion chambers as precisely as possible. To this end, an air flow meter, that is, a sensor for measuring the air mass or air quantity, is arranged in the fresh air system, expediently downstream of the filter device. It can be advantageous with regard to a compact design to arrange this air flow meter as close as possible to the filter device or as close as possible to the filter element.

A conventional filter element, which can be used as an air filter element, usually has an annular filter body consisting of a web-like, folded filter material, the filter body enclosing an inner space in the circumferential direction. Owing to manufacturing methods, such a filter body has an inhomogeneity at the point at which end folds of the filter material bound each other and are fastened to each other in the circumferential direction. For example, the end folds can be adhesively bonded to each other and correspondingly air-impermeable. This produces a flow through the filter element which is overall inhomogeneous in the circumferential direction. It has been found that the relative rotary position of the filter element in a filter housing has an effect on the measured values of the air flow sensor if the latter is positioned comparatively close to the filter element. Consequently, the air flow sensor must be calibrated when the filter element is inserted. This calibration process usually exceeds the material values of the filter element in terms of cost.

SUMMARY

The present invention is concerned with the problem of specifying an improved embodiment for a filter element of the above-mentioned type and for a filter device equipped therewith, which is characterised in particular in that changing of the filter element can be carried out in a comparatively cost-effective manner.

This problem is solved in the present invention in particular by the subject matter of the independent claims. Advantageous embodiments form the subject matter of the dependent claims.

The invention is based on the general concept of equipping the filter element with an inner frame, which has at least one alignment strip, which is arranged between two adjacent folds of the filter material. This alignment strip can itself be used as an alignment element or as a reference point for a separate alignment element. For example, according to a specific embodiment, the inner frame can have at least one part of a first end disc of the filter element, which has such a separate alignment element. A predefined rotary position of the filter element can be taken into account particularly simply when the associated filter device is installed in a housing by arranged an alignment strip, in particular in conjunction with such an alignment element, on the inner frame. In particular, the alignment strip can be positioned such that it is always in the same position relative to the end folds of the filter material during production of the filter element. In particular, the position of the end folds is automatically determined by means of the predefined relative position between the alignment strip and the alignment element. This therefore creates the possibility of installing the filter elements in the filter housing such that they always have the same positioning of the end folds. An influence on the measured values of the air flow meter is reduced thereby. In particular, repeated calibration of the air flow meter when a filter element is changed can be omitted. The inner frame has a tulip-shaped flow sleeve or is configured as a tulip-shaped flow sleeve. Depending on the direction of flow through the filter body, the flow sleeve is an inflow sleeve or an outflow sleeve. The flow sleeve is expediently arranged in the region of an end disc of the filter element and improves the flow through the end disc and can in particular improve the air flow measurement.

In particular configurations, the flow sleeve can have regions of different heights, in order to influence the flow behaviour. Furthermore, the flow sleeve can have bent regions, which can be used in particular to support the filter body.

In advantageous configurations, the flow sleeve forms a transition between a circular cross section and an oval cross section. Undesirable turbulence is prevented by the flow sleeve.

For example, the filter body can have an elliptical cross section, while the flow sleeve has a circular cross section at least axially on the outside. The flow sleeve can thereby abut a connection tube at its axial end face, which tube has a circular cross section. An enlarged filtration area can then be created with the filter body of cylindrical cross section.

According to another advantageous embodiment, the inner frame can have at least one part of an end disc, which axially delimits the filter body, the flow sleeve being formed on this end disc or on this part of the end disc. This increases the degree of integration of the inner frame, which simplifies the production of the filter element.

According to an advantageous embodiment, the end folds can be fastened to each other. For example, they can be adhesively bonded or fused or clipped to each other. The alignment strip then engages in a pocket formed between two adjacent folds. During production of the element, it should be ensured that the alignment strip always engages in the same pocket in relation to the end folds fastened to each other.

In an alternative embodiment, the end folds can be fastened to the alignment strip, for example by adhesive bonding, fusing or plasticising. Clipping is likewise conceivable in this case. The alignment of the end folds and of the alignment strip is thereby produced automatically, which reduces installation errors.

In another advantageous embodiment, the fixing of the end folds on the alignment strip can take place in that a clip element is attached radially on the outside, which grasps the two end folds and presses them against the alignment strip in the circumferential direction. Additionally or alternatively, the clip element can be adhesively bonded or fused to the end folds. The clip element extends over the entire axial length of the filter body. In an advantageous embodiment, the clip element can expediently project axially beyond the filter body, at least on one side of the filter body. The clip element expediently projects axially so far over the filter body that the clip element, after the attachment of an end disc, also projects through the latter, that is, stands out axially from the said end disc and thereby forms an alignment element. When the end disc is injection-moulded, the clip element is likewise overmoulded to prevent leaks of the clip element.

A counter-alignment element on the housing side can then interact axially with the clip element in order to effect the desired rotary position alignment of the filter element in the housing.

In another embodiment, in which it is not necessary to extend the clip element axially beyond the filter body, a counter-alignment element can be arranged on the housing in such a manner that it interacts radially with the clip element to align the filter element. In such an embodiment with a radially effective counter-alignment element, a clip element can in principle also be omitted. In this case it is sufficient to fix the end folds to the alignment strip. The alignment element is in this case formed by the alignment strip and the end folds attached thereto. The counter-alignment element can then again interact radially with this alignment element to align the filter element.

In another advantageous embodiment, the inner frame can have at least one perforated disc, which extends perpendicularly to the longitudinal centre axis of the filter element. Such a perforated disc can homogenise the flow through the filter element, which is advantageous in particular if an air flow sensor is positioned comparatively close to the clean-side outlet of the filter element. The perforated disc is expediently positioned axially between the first end disc and a second end disc of the filter element. The perforated disc can in principle be positioned closer to the end disc which forms the clean-side outlet. Since the first end disc is equipped with the at least one alignment element, the first end disc can preferably be designed as a closed end disc. The second end disc is advantageously designed as a centrally open end disc which forms the clean-side outlet. Accordingly, the perforated disc is expediently positioned closer to the second end disc.

It can advantageously be provided for the inner frame to have at least one part of a first end disc which axially delimits the filter body as an integral component, it being possible for this part to have the above-mentioned alignment element. Additionally or alternatively, the inner frame can have at least one part of a second end disc which axially delimits the filter body as an integral component, it being possible for this part to form or have the flow sleeve.

The inner frame can expediently have at least one axially extending supporting strip, which axially supports the first end disc on a second end disc. The filter body and the filter element can be significantly stiffened and stabilised thereby.

In a further advantageous embodiment, the at least one alignment element formed on the first end disc can be configured as a component of a clip connection. A counter-piece to this clip connection is then expediently formed on the filter housing. In this manner it can be ensured that the desired alignment of the filter element is only present if the clipping takes place properly. In particular, the at least one alignment element can be arranged eccentrically, that is, at a distance from the longitudinal centre axis of the filter body, on the first end disc. This simplifies an unambiguous rotary position alignment.

In another advantageous embodiment, the inner frame can be injection-moulded integrally with the associated part of the first end disc and the alignment strip. The at least one alignment element is expediently also formed integrally on the respective part of the first end disc. A specified, defined relative position between the alignment strip and the first end disc or alignment element is always provided thereby, as a result of which installation errors and installation tolerances can be avoided. Furthermore, the inner frame can also be produced integrally with the above-mentioned perforated disc and/or with the at least one above-mentioned supporting strip and/or with the above-mentioned flow sleeve. The inner frame thereby gains a high level of functionality and complexity, as a result of which the production of the filter element is cost-effective, despite the comparatively large number of integrated functional elements.

The inner frame can expediently be divided into two inner frame halves in an axial plane containing the longitudinal centre axis. The injection-moulding dies for producing the inner frame or for producing the inner frame halves can be simplified by the division of the inner frame, which makes the production of the inner frame and thus the filter element more cost-effective.

According to an advantageous development, it can be provided for the two inner frame halves to be connected to each other by a living hinge, which defines a pivot axis running parallel to the longitudinal centre axis. Integral injection-moulding of the inner frame in one piece is thus realised, despite the division in the axial plane. The inner frame halves can expediently be equipped with at least one latching system, which, after the two inner frame halves have been injection-moulded and pivoted about the pivot axis defined by the living hinge, latches the two inner frame halves to each other, as soon as the inner frame has its cylindrical shape for arranging the filter body.

In another development, one inner frame half can be injection-moulded integrally with the associated part of the first end disc, while the other inner frame half is injection-moulded integrally with the perforated disc.

In a further advantageous embodiment, the first end disc can have an annular region, which axially closes the filter body, and a closed central core region, which is surrounded by the annular region. This core region is formed by the part of the inner frame associated with the first end disc, while the annular region is moulded or foamed onto the core region. This makes it possible to arrange the filter body on the inner frame and and to seal it axially by attaching the annular region and in the process to fix it to the inner frame.

In a further embodiment, a second end disc can have an annular region, which axially closes the filter body, and an open central core region, which is surrounded by the annular region. The core region is formed by the flow sleeve of the inner frame, while the annular region is moulded or foamed onto the core region. This produces the same advantage, whereupon the filter body arranged on the inner frame is axially sealed and fixed to the inner frame by the attachment of the annular region.

In a particularly advantageous embodiment, it can be provided in the end disc, the open central core region of which forms or has the flow sleeve, for the moulded or foamed annular region to have a radially effective sealing contour, into which a connection piece of the filter device can be axially inserted in such a manner that the connection piece axially abuts the flow sleeve, the sealing contour overlapping the flow sleeve axially and bearing radially against the connection piece. A leaktight transition between the connection piece and the flow sleeve is realised thereby. The sealing contour is expediently moulded or formed with the annular region onto the flow sleeve.

A filter device according to the invention comprises a filter housing and a filter element of the above-described type. The filter element separates an untreated side from a clean side in the filter housing. The filter housing has at least one counter-alignment element, which is configured and positioned in such a manner that it interacts with the at least one alignment element of the filter element when the filter element is inserted in order to align the filter element in a predefined rotary position. In this manner the predefined rotary position is set automatically when the filter element is inserted, so incorrect installations can be largely prevented. The filter housing of the filter device can in particular have the above-mentioned connection piece.

A fresh air system according to the invention comprises a filter device of the above-described type and an air flow sensor, which is installed in an air flow path downstream of the filter element. The air flow sensor can in particular be mounted on the filter housing.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures,

FIG. 1 shows a highly simplified, schematic sectional diagram of a fresh air system of an internal combustion engine in the region of a filter device, FIG. 2 shows a cross section through a filter element, FIG. 3 shows an enlarged detail view of the cross section of FIG. 2 in the region of an alignment strip, FIG. 11 shows a cross section of the filter device according to section lines XI of FIG. 10, FIG. 12 shows an enlarged detail of the cross section of FIG. 11, FIG. 13 shows the detail of FIG. 12 in a viewing direction XIII in FIG. 12.

DETAILED DESCRIPTION

Figure 4:
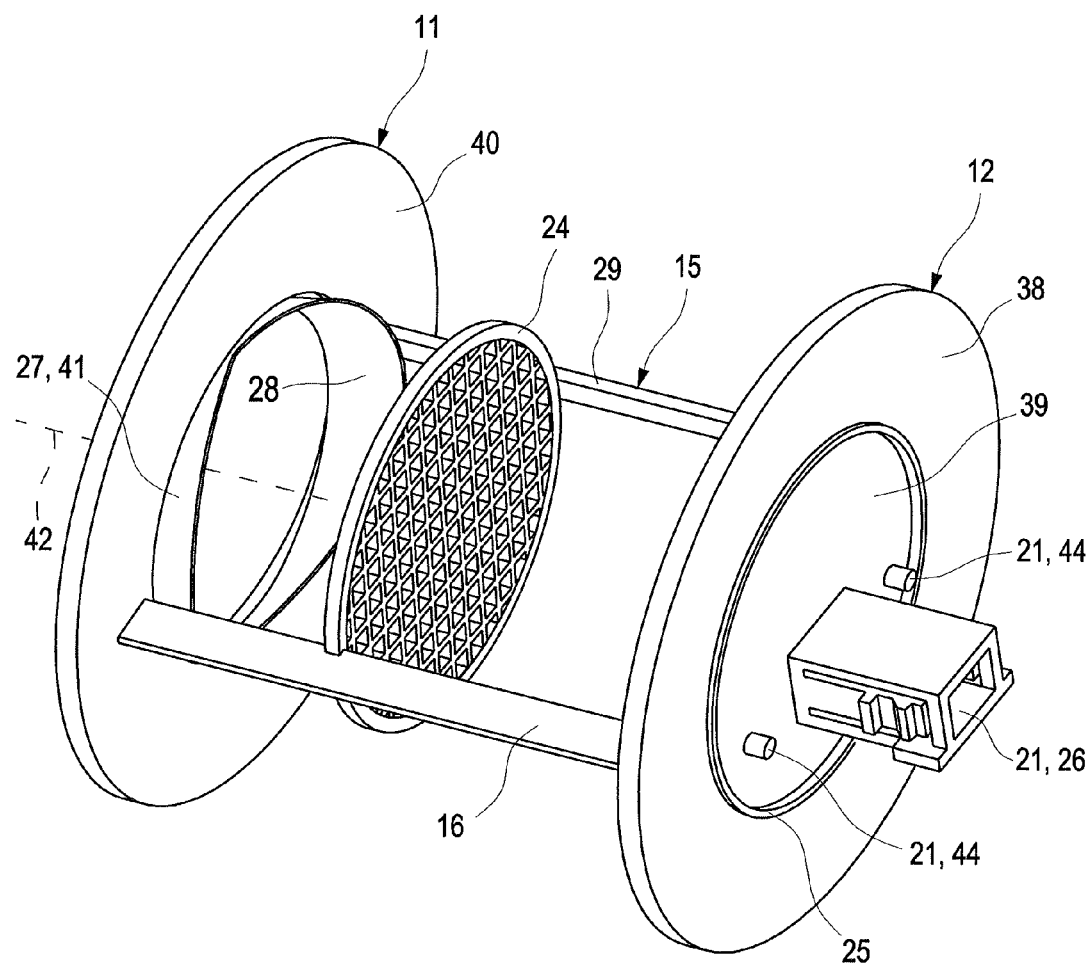
FIG. 4 shows an isometric view of a filter element in another embodiment, with the filter body omitted.

According to FIG. 1, a fresh air system 1, only part of which is shown and which is used to supply an internal combustion engine with fresh air, comprises a filter device 2 and an air flow meter 3, which is arranged in an air flow path 5, indicated with a dashed line, downstream in relation to an air flow 4, indicated by arrows, of a filter element 6, which separates an untreated side 8 from a clean side 9 in a housing 7 of the filter device 2. To this end, the filter element 6 has a filter body 10 and two end discs 11, 12, which delimit the filter body 10 axially. The annular or cylindrical filter element 6 has a longitudinal centre axis 42, which defines an axial direction.

As can be seen in particular in FIGS. 2 and 3, the filter body 10 has a circular ring shape and is produced from a web-like, folded filter material 13. In the circumferential direction, the filter body 10 encloses a circular-cylindrical inner space 14, which forms the clean side 9 if flow passes through according to FIG. 1. The filter element 6 is also equipped with an inner frame 15, which is arranged on an inner side of the filter body 10 facing the inner space 14.

The inner frame 15 has at least one radially outwardly projecting alignment strip 16, which extends axially, preferably over the entire axial length or height of the filter body 10. According to FIG. 3, the alignment strip 16 engages radially between two folds 17 in the folded filter material 13, which are adjacent in the circumferential direction, and comes to bear against these folds 17.

In the example of FIGS. 2 and 3, two end folds 18 in the web material 13 which bound each other in the circumferential direction are fastened to each other, by means of a clip element 19. In the embodiment shown in FIGS. 2 and 3, the alignment strip 16 is inserted into a pocket 20 which is formed by two "normal" folds 17, that is, not by the end folds 18 and is radially inwardly open. According to FIG. 3, the alignment strip 16 can have a profile formed complementary to the inner space of the pocket 20.

Alternatively, FIGS. 5 to 13 show embodiments in which the end folds 18 are arranged on the alignment strip 16 and are in particular fastened thereto. It is particularly expedient if the end folds 18 are fastened to the alignment strip 16 by means of such a clip element 19. For example, the clip element 19 compresses the end folds 18 with the alignment strip 16. To this end, the clip element 19 is pressed radially outwardly onto the end folds 18 and the alignment strip 16. The clip element 19 can then be used as an alignment element arranged radially on the filter body 10. Such an alignment element is referred to below with 21.

Figure 5:
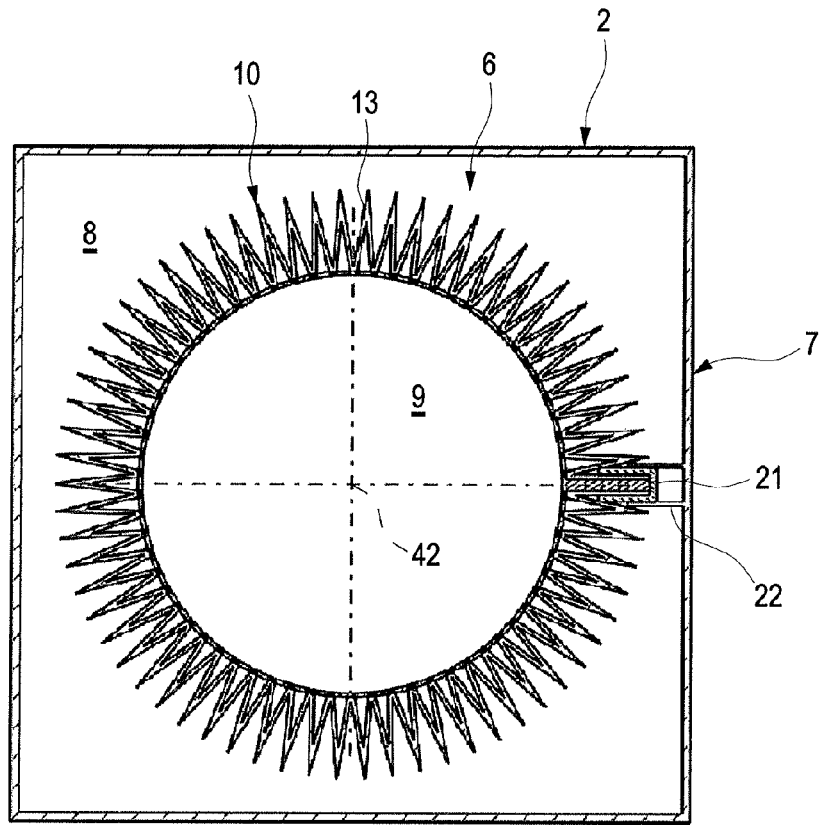
FIG. 5 shows a cross section through a filter device with a filter element in a further embodiment.
Figure 6:
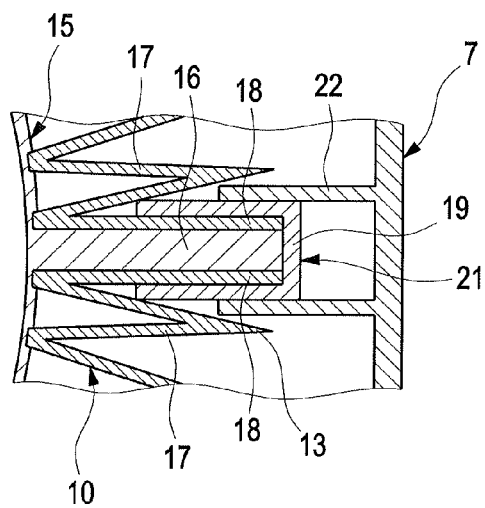
FIG. 6 shows an enlarged detail of the cross section of FIG. 5.

According to the embodiment shown in FIGS. 5 and 6, the filter device 2 can have on the housing 7 a counter-alignment element 22, which fits the alignment element 21 and interacts radially with the alignment element 21 in order to align the rotary position of the filter element 6. As a result, the alignment strip 16 and the end folds 18 are always in the same relative position to the housing 7. For example, the counter-alignment element 22 is formed as a radially inwardly open U-profile, which projects inwardly from a side wall of the housing 7.

Figure 7:
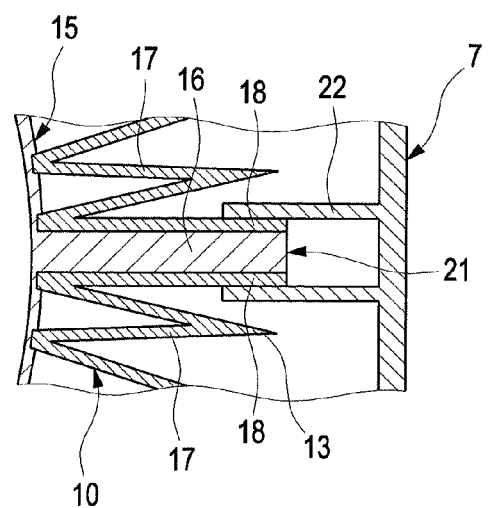
FIG. 7 shows a detail as in FIG. 6, but in a different embodiment.
Figure 8:
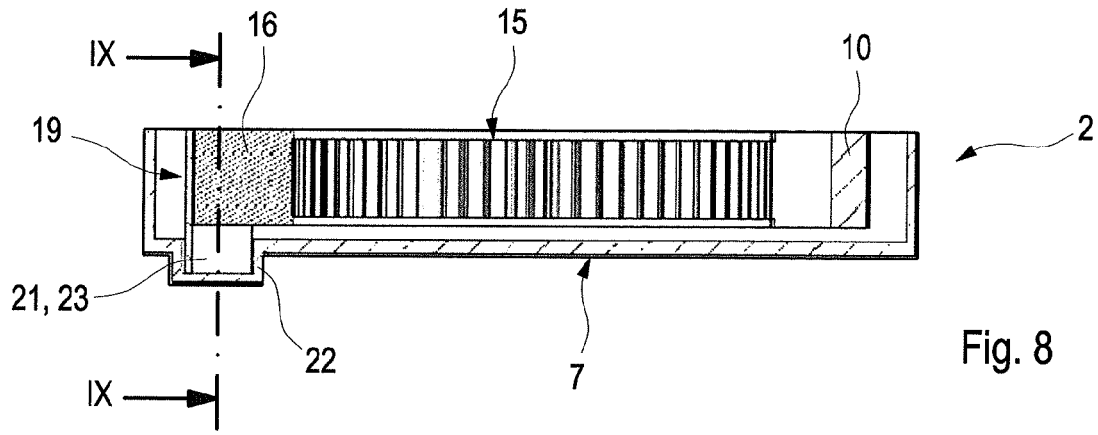
FIG. 8 shows a longitudinal section of the filter device in the region of an axial end face in a further embodiment corresponding to section lines VIII in FIG. 9.
Figure 9:
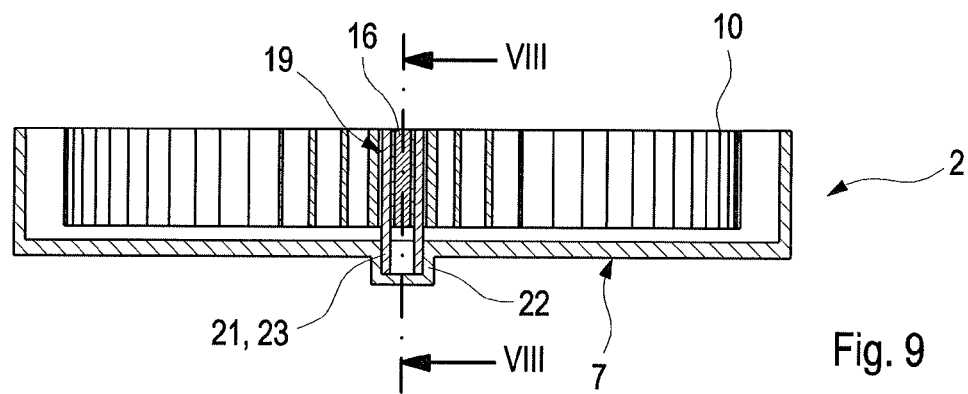
FIG. 9 shows a simplified, partially sectioned side view of the filter device of FIG. 8 corresponding to section lines IX in FIG. 8.
Figure 10:
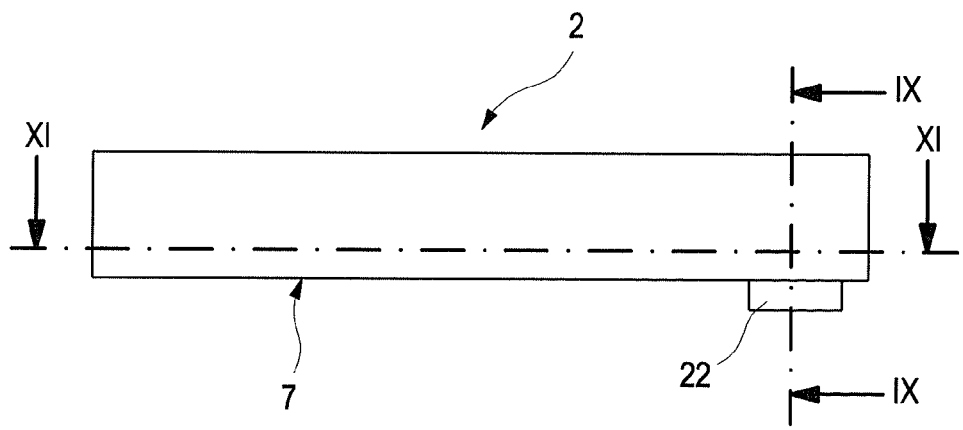
FIG. 10 shows a side view of the region of FIG. 8, but in the opposite viewing direction.

In an embodiment shown in FIG. 7, the clip element 19 can be omitted. In this case, the end folds 18 are connected in a leaktight manner to the alignment strip 16. For example, the end folds 18 can be adhesively bonded or fused or plasticised to the alignment strip 16. In this case, the alignment strip 16 together with the end folds 18 attached thereto can directly form the radially effective alignment element 21, which interacts radially with the counter-alignment element 22 of the housing 7.

In the embodiment shown in FIGS. 8 to 13, the clip element 19 is configured to project axially at least at one end over the filter body 10. An end of the clip element 19 projecting axially over the filter body 10 is referred to with 23. In this embodiment, this projecting clip element end 23 can be used as an alignment element 21, which is in this case oriented axially. A complementary counter-alignment element 22, which interacts axially with the alignment element 21, that is in this case the projecting end 23 of the clip element 19, is then provided on the housing 7 of the filter device 2. For example, the counter-alignment element 22 is in this case formed as an axial depression in an end-face wall section of the housing 7.

The clip element 19 can likewise be surrounded by the material of the end discs when the end discs 11, 12, which are preferably foamed or moulded onto the filter body 10 or plasticised thereto, are attached. The end disc 11, 12 associated with the projecting end 23 of the clip element 19 can be axially penetrated by the clip element 19, so the projecting end 23 stands out axially from the said end disc 11, 12 after the respective end disc 11, 12 has been attached.

According to FIGS. 3, 4 and 14 to 16, the inner frame 15 can also have a perforated disc 24. The perforated disc 24 extends perpendicularly to the longitudinal centre axis 42 of the filter element 6 and is used to smooth the air flow 4. The perforated disc 24 is positioned between the two end discs 11, 12. The perforated disc 24 is expediently arranged closer to the end disc 11, 12 through which the air flow 4 exits in the direction of the hot film meter 3. The filter body 10 can be supported radially inwardly on the perforated disc 24, so the perforated disc 24 acts as a supporting ring of the inner frame 15. According to FIG. 4, the perforated disc 24 can be the only supporting ring of the inner frame 15. According to FIGS. 14 to 16, the inner frame 15 can likewise have at least one further supporting ring 43. The perforated disc 24 according to FIG. 3 is circular. In the configurations according to FIGS. 4 and 14 to 17, the perforated disc 24 is oval. The filter body 10 supported on the oval perforated disc 24 thus forms an oval-cylindrical inner space.

According to FIGS. 4 and 14 to 16, the inner frame 15 can also have at least one part of one of the end discs 11, 12. In the example, this is the end disc 12, which is referred to below as the first end disc 12. In principle, it is possible to arranged at least one alignment element 21 on this part 25 of the first end disc 12. In the example of FIG. 4, three such alignment elements 21 are arranged purely by way of example. These can be provided optionally or cumulatively. If the alignment takes place with the aid of the alignment element 21 formed by the clip 19 or with the alignment strip 16 according to the variants of FIGS. 5 to 13, the alignment elements 21 formed on the part 25 of the first end disc 12 and shown in FIG. 4 can be omitted.

The alignment elements 21 shown in FIG. 4 can be designed as simple, axially projecting pins 44 and/or as a clip element 26, which interacts with a complementary counter-clip element (not shown), which is formed on the housing 7 of the filter device 2. The desired rotary position alignment then takes place automatically owing to the fixing or clipping of the filter element 6 in the filter housing 7.

Figure 17:
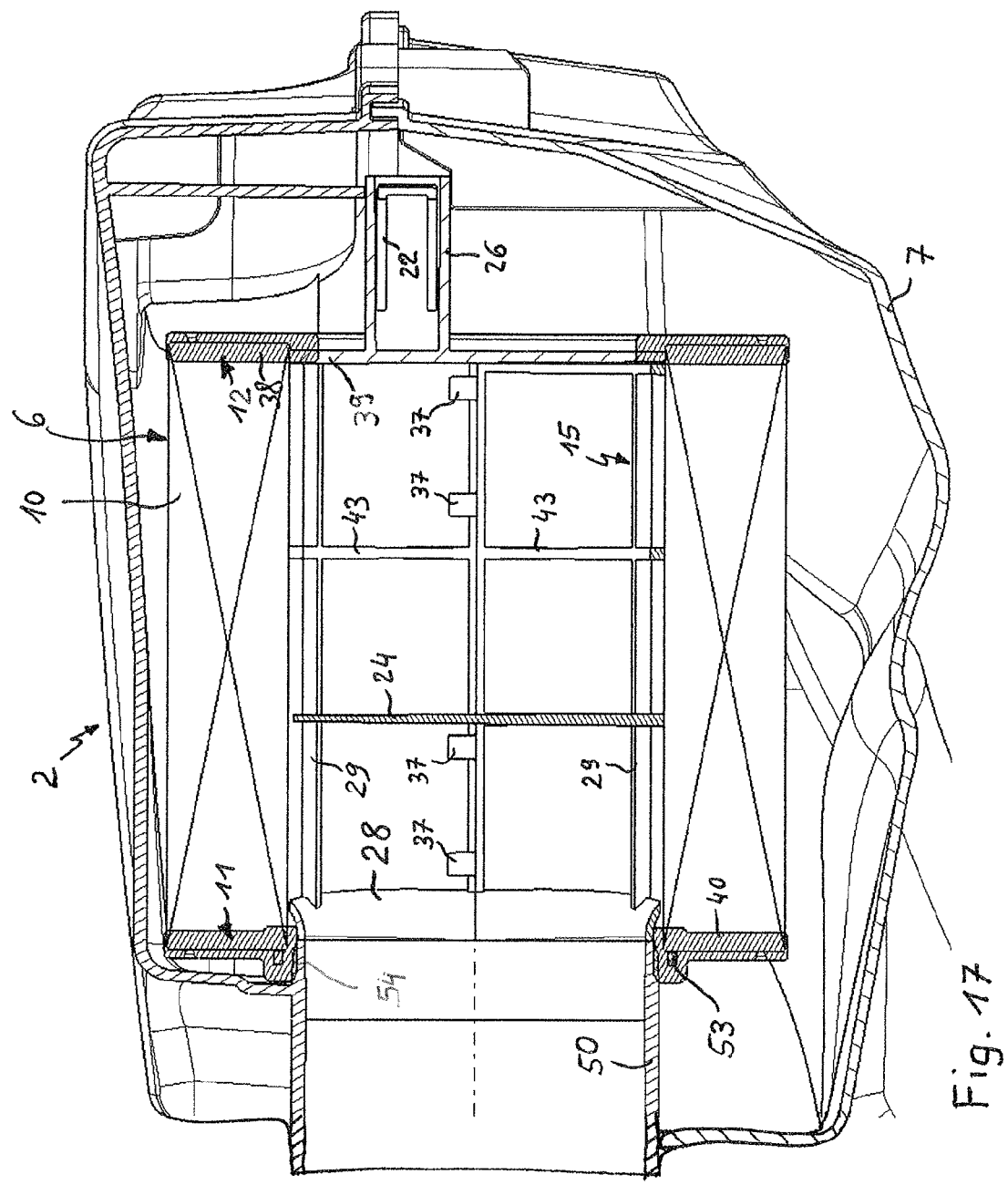
FIG. 17 shows a fresh air device in section.

In the embodiment shown in FIG. 4, the inner frame 15 also has at least one part 27 of the other end disc 11. This is the end disc 11, which is referred to below as the second end disc 11. This part 27 of the second end disc 11 forms a flow sleeve 28 or has such a flow sleeve 28. In the example, the flow sleeve 28 acts as an outflow sleeve. The flow sleeve 28 has a circular cross section, while the end disc 11 is oval. Furthermore, the circular flow sleeve 28 projects axially into the oval inner space of the filter element 6. In this case, the flow sleeve 28 has regions of different axial heights. The axial height of the flow sleeve 28 is lower in the region of the short axis of the oval end disc 11 than in the region of the longer axis. An improved flow behaviour of the cleaned air out of the inner space into the connection piece 50 according to FIG. 17 is thus achieved. As can be seen in particular in FIGS. 15 and 17, the flow sleeve 28 is bent. The bend runs in such a manner that the flow sleeve 28 has a greater diameter at the axially inwardly projecting end than at the region close to the end disc. The inflow of the air into the flow sleeve region is improved thereby. The region of the flow sleeve 28 close to the end disc has approximately the same inner diameter as the adjoining connection piece 50. The air is thus conducted without further turbulence.

According to FIG. 4, the inner frame 15 is also equipped with at least one supporting strip 29, which extends axially, that is, parallel to the longitudinal centre axis 42 of the filter element 6, and supports the two end discs 11, 12 axially against each other. In the each of the embodiments of FIGS. 2 and 4, only one such supporting strip 29 is provided. The embodiments of FIGS. 5 and 11 do not have a supporting strip 29. In the embodiment shown in FIGS. 14 to 16, several supporting strips 29 are provided. The supporting strips 29 penetrate into the flow sleeve 28 and are thus supported radially. Furthermore, the flow sleeve 28 radially supports the filter body 10. In this case, the bent edge of the flow sleeve 28 in the axially longer direction of the oval end disc 11 likewise forms an oval, on which the oval inner contour of the filter body 10 is supported.

The inner frame 15 is expediently injection-moulded integrally with the alignment strip 16. Furthermore, the inner frame 15 can comprise as a further integral component the part 25 of the first end disc 12 and/or the perforated disc 24 and/or the at least one supporting strip 29 and/or the part 27 of the second end disc 11 with the flow sleeve 28.

Figure 14:
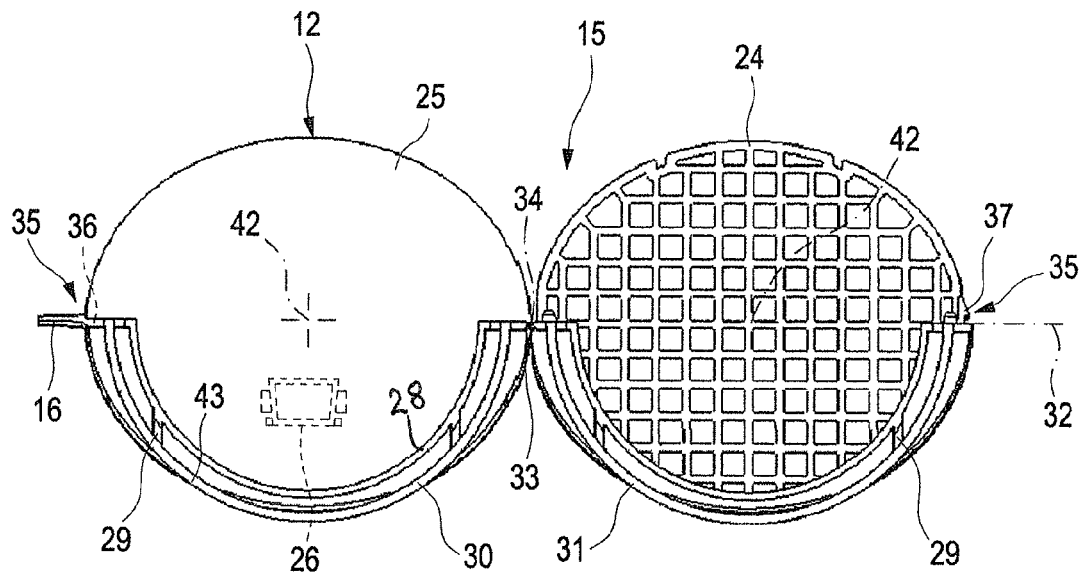
FIG. 14 shows an axial view of an inner frame of the filter element in the case of a two-part embodiment in the folded open state.
Figure 15:
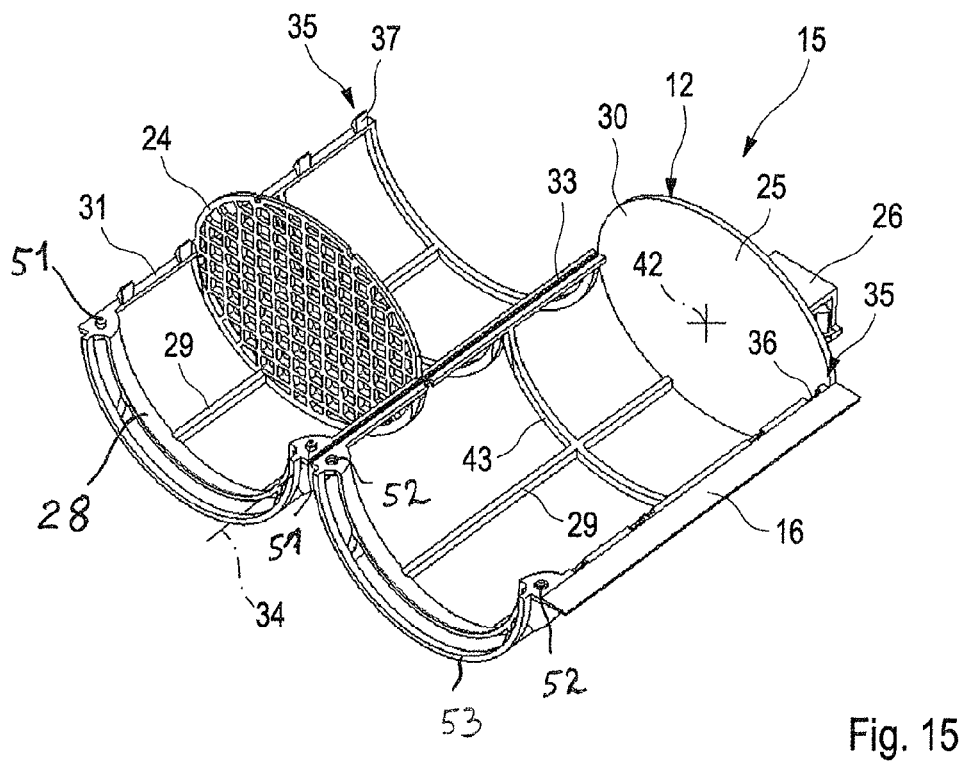
FIG. 15 shows an isometric view of the two-part inner frame in the folded open state.
Figure 16:
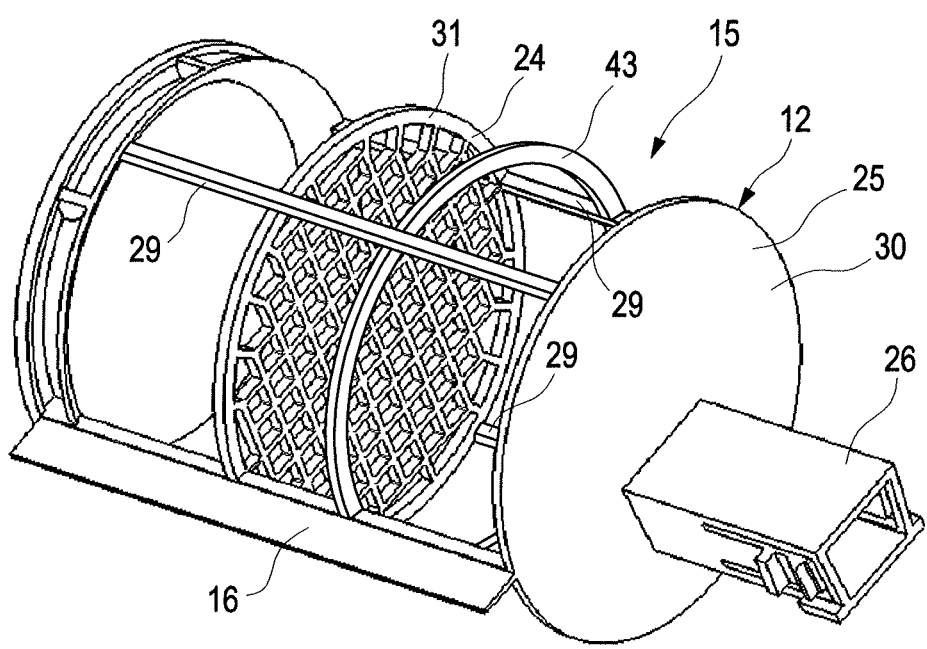
FIG. 16 shows a further isometric view of the two-part inner frame in the folded closed state.

In the embodiment shown in FIGS. 14 to 16, the inner frame 15 is divided into two inner frame halves 30, 31, in an axial plane 32 containing the longitudinal centre axis 42 of the filter element 6. According to the preferred embodiment presented here, the two inner frame halves 30, 31 are connected to each other by means of a living hinge 33. The living hinge 33 defines a pivot axis 34, which extends parallel to the longitudinal centre axis 42. A latching system 35 can be formed on the inner frame halves 30, 31, which latching system comprises for example at least one latching opening 36 on one inner frame half 30 and at least one latching hook 37 on the other inner frame half 31. In the folded state, the latching hooks 37 then penetrate the latching openings 36 and form the form-fitting latching system 35 of the two inner frame halves 30, 31 in the folded together state. For the exact positioning of the inner frame halves 30, 31, alignment pins 51 are provided, which engage in alignment recesses 52. This produces an exact, circular shape of the inner flow sleeve 28. For stabilisation, in particular of an annular region 40, a stabilisation ring 53 is provided.

In the example shown here, one inner frame half 30 is formed integrally with the part 25 of the first end disc 12 and in particular also with the clip element 26. The other inner frame half 31 is integrally injection-moulded with the perforated disc 24.

According to FIG. 4, the first end disc 12 has an annular region 38, which axially closes the filter body 10 (not shown here), and a closed, central core region 39, which is surrounded by the annular region 38. The core region 39 is formed by the part 25 of the first end disc 12, which is in this case formed on the inner frame 15. The annular region 38 is therefore moulded or foamed onto this core region 39, that is, onto the part 25 of the inner frame 15. The second end disc 11 has an annular region 40, which axially closes the filter body 10 (not shown), and an open, central core region 41, which is surrounded by the annular region 40. The core region 41 is in this case formed by the part 27 of the second end disc 11, which is formed on the inner frame 15 and in this case forms the flow sleeve 28. The annular region 40 is therefore moulded or foamed onto this core region 41, that is, onto the part 27 of the inner frame 14.

FIG. 17 shows a fresh air device 2 in section. This fresh air device 2 contains a filter element 6 having an inner frame 15 according to FIG. 14 to 16. The fresh air device 2 has a housing 7, which has the connection piece 50. Furthermore, the filter element 6 has a filter body 10 and two end discs 11, 12. Identical components are provided with the same reference symbols. The stabilisation ring 53 is surrounded by the material of the annular region 40. Reliable sealing of the annular region 40 on the connection piece 50 is thus ensured. In the example of FIG. 17, the moulded annular region 40 has a sealing contour 54 to realise radial sealing off from the connection piece 50. The sealing contour 54 overlaps the flow sleeve 28 in the axial direction on a radially outward side. The filter element 6 can thereby be inserted into the housing 7 in such a manner that the connection piece 50 can be inserted coaxially into the second end disc 11 and thus coaxially into the sealing contour 54, until the connection piece 50 and the flow sleeve 28 abut each other axially at the end faces.

The invention claimed is:

1. A filter element for a filter device for filtering a fluid, comprising: an annular filter body having a longitudinal centre axis and including a web-like, folded filter material, the filter body enclosing an inner space in a circumferential direction of the axis, and
   an inner frame arranged on an inner side of the filter body facing the inner space,
   wherein the inner frame has at least one radially outwardly projecting and axially extending alignment strip arranged between two adjacent folds in the filter material in the circumferential direction, wherein the at least one alignment strip bears against the two adjacent folds,
   wherein the inner frame includes a flow sleeve disposed at an axial end of the inner frame, and wherein the flow sleeve extends in the circumferential direction to surround a flow opening and projects axially into the inner space of the filter body.

2. The filter element according to claim 1, wherein
   the end folds of the filter material are fastened to each other, and
   the at least one alignment strip engages in a pocket formed between two adjacent folds.

3. The filter element according to claim 1, wherein the two folds are end folds, and wherein the end folds of the filter material are coupled to the alignment strip, and
   a clip element securing the two end folds of the filter material against the alignment strip, wherein the clip element engages each of the end folds in the circumferential direction.

4. The filter element according to claim 3, wherein at least one of
   the alignment strip forms an alignment element with the end folds fastened thereto, and
   the clip element forms an alignment element, wherein the clip element at least one of projects axially over the filter body, and projects over the filter body through an end disc which axially delimits the filter body.

5. The filter element according to claim 1, wherein the inner frame has at least one perforated disc, the at least one perforated disc extending perpendicularly to the longitudinal centre axis of the filter body.

6. The filter element according to claim 1, wherein
   the inner frame includes part of a first end disc disposed at one axial end and which axially delimits the filter body, wherein the part of the first end disc includes at least one alignment element,
   the inner frame includes part of a second end disc disposed at the other axial end and which axially delimits the filter body, wherein the part of the second end disc includes the flow sleeve, wherein the flow sleeve defines a circular cross-section and forms a transition to an elliptical cross-section of at least one of the part of the second end disc and the inner space,
   the inner frame has at least one axially extending supporting strip which axially supports the first end disc on the second end disc.

7. The filter element according to claim 1, wherein the at least one alignment element is configured as a component of a clip connection.

8. The filter element according to claim 6, wherein the inner frame is injection-moulded integrally with at least one of the alignment strip, the part of the first end disc, at least one perforated disc, the at least one supporting strip, and the part of the second end disc.

9. The filter element according to claim 8, wherein the inner frame is divided into two separable inner frame halves in an axial plane containing the longitudinal centre axis.

10. The filter element according to claim 9, wherein the inner frame halves are connected to each other such that they can pivot about a pivot axis running parallel to the longitudinal centre axis via a living hinge.

11. The filter element according to claim 9, wherein one inner frame half is injection-moulded integrally with at least one of the alignment strip and the part of the first end disc, and the other inner frame half is injection-moulded integrally with the perforated disc.

12. The filter element according to claim 6, wherein
   each end disc has a respective annular region which axially closes the filter body, and one of a closed and open central core region which is surrounded by the annular region,
   the core region is formed by the part of the inner frame associated with the respective end disc, and
   the annular region is at least one of moulded and foamed onto the core region.

13. The filter element according to claim 12, wherein the end disc having the open central core region that at least one of forms and has the flow sleeve includes the annular region having a radially effective sealing contour, the sealing contour into which a connection piece can be inserted axially until it axially abuts the flow sleeve, wherein the sealing contour axially overlaps the flow sleeve and bears radially against the connection piece when installed.

14. A filter device for filtering a fluid, comprising:
a filter housing,
a filter element having a longitudinal centre axis configured to separate an untreated side from a clean side in the filter housing, the filter element including:
  an annular filter body having a web-like folded filter material, the filter body enclosing an inner space in a circumferential direction of the longitudinal centre axis, and
  an inner frame arranged on an inner side of the filter body facing the inner space,
  wherein the inner frame has at least one radially outwardly projecting and axially extending alignment strip arranged between two adjacent folds in the filter material in the circumferential direction, wherein the at least one alignment strip bears against the two adjacent folds, and wherein the two folds are secured against the at least one alignment strip via a clip element, the clip element engaging each of the two folds in the circumferential direction,
  wherein the inner frame at least one of includes a flow sleeve and is configured as a flow sleeve,
wherein the clip element defines an alignment element, and wherein the filter housing has at least one counter-alignment element which receives the alignment element when the filter element is inserted into the filter housing in order to align the filter element into a predefined rotary position.

15. A fresh air system of an internal combustion engine, comprising:
a filter housing;
a filter element having a longitudinal centre axis configured to separate an untreated side from a clean side in the filter housing, the filter element including:
  an annular filter body having a web-like folded filter material, the filter body enclosing an inner space in the circumferential direction, and
  an inner frame arranged on an inner side of the filter body facing the inner space,
  wherein the inner frame has at least one radially outwardly projecting and axially extending alignment strip arranged between two adjacent folds in the filter material in the circumferential direction, wherein the at least one alignment strip bears against the two adjacent folds,
  wherein the inner frame includes a flow sleeve disposed at an axial end of the inner frame, the flow sleeve extending in the circumferential direction to surround a flow opening and projects axially into the inner space of the filter body, and wherein at least one of (i) the flow sleeve includes at least two regions of different axial extents in relation to one another, and (ii) the flow sleeve defines a circular cross-section and the inner space defines an elliptical cross-section,
wherein the filter housing has at least one counter-alignment element which interacts with at least one alignment element when the filter element is inserted into the filter housing in order to align the filter element into a predefined rotary position, and
an air flow meter arranged in an air flow path downstream of the filter element.

16. The filter device according to claim 14, wherein:
the inner frame includes at least one part of a first end disc which axially delimits the filter body, wherein the part of the first end disc includes the at least one alignment element,
the inner frame includes at least one part of a second end disc which axially delimits the filter body, wherein the part of the second end disc includes the flow sleeve, and wherein the flow sleeve includes at least two regions of different axial extents in relation to one another, and
the inner frame has at least one axially extending supporting strip which axially supports the first end disc on the second end disc.

17. The filter device according to claim 16, wherein each disc has a respective annular region which axially closes the filter body, and wherein the first disc includes a closed central core region surrounded by the annular region, and the second end disc includes an open central core region surrounded by the annular region, further wherein the flow sleeve extends in the circumferential direction about the open central core region of the second end disc and projects axially into the inner space of the filter body.

18. The fresh air system according to claim 15, wherein the inner frame has at least one perforated disc, the at least one perforated disc extending perpendicularly to the longitudinal centre axis of the filter element.

19. The fresh air system according to claim 15, wherein at least one of:
the inner frame includes at least one part of a first end disc which axially delimits the filter body, wherein the part of the first end disc includes the at least one alignment element,
the inner frame includes at least one part of a second end disc which axially delimits the filter body, wherein the part of the second end disc includes the flow sleeve, and
the inner frame has at least one axially extending supporting strip which axially supports the first end disc on the second end disc.

20. The filter element according to claim 1, wherein at least one of (i) the flow sleeve includes at least two regions of different axial extents in relation to one another, and (ii) the flow sleeve defines a circular cross-section and the inner space defines an elliptical cross-section.

* * * * *